United States Patent [19]

Weininger et al.

[11] 4,406,752

[45] Sep. 27, 1983

[54] ELECTROWINNING OF NOBLE METALS

[75] Inventors: Joseph L. Weininger; Bang M. Kim, both of Schenectady, N.Y.

[73] Assignee: General Electric Company, Schenectady, N.Y.

[21] Appl. No.: 444,931

[22] Filed: Nov. 29, 1982

Related U.S. Application Data

[63] Continuation-in-part of Ser. No. 320,252, Nov. 12, 1981.

[51] Int. Cl.³ .............................................. C25B 1/07
[52] U.S. Cl. ...................................... 204/3; 204/12; 204/109; 204/110
[58] Field of Search ............................. 204/109–111, 204/294, 3–4, 12

[56] References Cited

U.S. PATENT DOCUMENTS 4,330,387  5/1982  Astruc et al. ...................... 204/294

*Primary Examiner*—R. L. Andrews
*Attorney, Agent, or Firm*—Lawrence D. Cutter; James C. Davis, Jr.; Marvin Snyder

[57] ABSTRACT

Nobel metals such as silver and gold are removed from solutions containing them in an electrolytic process in which the cathode of an electrolytic cell comprises a carbon fiber mass. Metal ions are plated out on to the carbon fibers which exhibit a large surface area in the highly porous cathode. Recovery of the metal values is obtained through heating the plated fiber mass to a temperature sufficient to burn off the carbon fibers.

4 Claims, No Drawings

ELECTROWINNING OF NOBLE METALS

BACKGROUND OF THE INVENTION

This invention is a continuation-in-part of application Ser. No. 320,252, filed Nov. 12, 1981.

The present invention relates to an electrochemical method for recovering noble metals from solutions containing them. In particular, it relates to a method for recovery of noble metals from solutions containing relatively low concentrations of metals such as silver and gold.

In many mining operations solutions containing small amounts of noble metals are often produced by leaching ores. This is particularly true in hydrometallurgical mining methods. It is also particularly true in the mining of noble metals such as gold and silver. However, because the concentration of these metals in the solutions produced is typically extremely low, electrochemical deposition is difficult. The principal reasons for this difficulty are problems associated with electrode kinetics and mass transfer limitations both of which are severe problems. Accordingly, electrochemical deposition of noble or precious metals such as silver amd gold at low concentrations is severely limited as a recovery method in hydrometallurgical mining of such metals.

At present, electrochemical deposition of such metals employs the use of metallic fibers on which the metals are deposited. The resultant composite metal is subsequently heated to melt and separate the nonnoble substrate metal from the desired noble deposit. The nonnoble metal fibers used are typically either steel or stainless steel. However, ordinary steel fibers rust and accordingly, stainless steel fibers are preferably employed. However, as currently employed stainless steel fibers have relatively large diameters. Accordingly, in a fiber mat or mass of stainless steel wool, the larger diameter fibers provide less surface area than is otherwise obtainable through the use of carbon fiber masses, which are disclosed for use in the present invention. Moreover, deposition of gold on stainless steel with a subsequent melting process for separations usually results in contamination of the gold product and generally requires temperatures sufficient to melt all metals present. This high temperature process is thus expensive due to the thermal energy required for the dual melting. However, because of the increasing value of noble metals such as gold and silver, more care is being exercised in recovering them even from very dilute solutions, for example, in the range from 0.1 to 10 parts per million. Greater recovery efforts are being put forth both in metal recovery from electroplating waste solutions and in electrowinning operations in which large, though dilute sources of noble metals are produced, such as in mining operations. Whereas previous electrolytic work, both of others and of the instant inventors, has concentrated on the removal of heavy metals from waste water, the application of electrochemical deposition on carbon fibers to electrowinning of noble metals in mining is new and provides great economic opportunity.

SUMMARY OF THE INVENTION

In accordance with a preferred embodiment of the present invention electrowinning of noble metals comprises passing a solution containing the noble metals through an electrolytic cell having an anode and a cathode, the cathode of which comprises a carbon fiber mass. Simultaneously, a dc voltage is applied between the anode and the cathode to deposit dissolved metal ion species on the carbon fibers. Following the plating operation, the plated fibers are removed from the electrolytic cell and heated to a temperature sufficient to burn off the carbon fibers. The carbon fibers can be removed through oxidation at a temperature as low as 250° C.; however, depending on metal deposition density, it may be necessary to heat the fiber-metal compact above the melting point of the metal particularly when some of the carbon fibers are inaccessible due to the deposition of metal on them.

The present invention provides several significant advantages over conventional electrowinning processes. In particular, the use of carbon fibers presents a much larger surface area to the solution since the carbon fibers are typically approximately one-tenth the diameter of steel wool fibers. Additionally the carbon fiber electrode exhibits a high porosity and provides ample surface area for deposition. This aspect of the present invention is significant in that it alleviates mass transfer limitations in electrochemical deposition. Furthermore, the carbon fiber cathode of the present invention has a significantly lower cost and affords the opportunity for a much simpler separation of the metal deposit from the carbon substrate. In particular, separation of the deposited metal from the carbon substrate is accomplished simply by burning off the carbon at relatively low temperatures, without having to melt the deposited metal, therefore leaving a relatively pure deposit behind.

Accordingly, it is an object of the present invention to provide a method for recovering noble metals from dilute solutions containing them.

It is also an object of the present invention to provide a method for the facile separation of electrochemically deposited noble metals from an underlying cathode substrate.

Lastly, it is an object of the present invention to provide an economic method for the recovery of noble and precious metals from dilute aqueous concentrations.

The subject matter which is regarded as the invention is particularly pointed out and distinctly claimed in the concluding portion of the specification. The invention, however, both as to organization and method of practice, together with further objects and advantages thereof may best be understood by reference to the following description.

DETAILED DESCRIPTION OF THE INVENTION

In accordance with a preferred embodiment of the present invention a method for electrowinning of noble metals comprises a process in which a solution containing one or more noble metals is passed through a conventional electrolytic cell. Such cells conventionally possess anode and cathode electrodes, the cathode electrode being connected to the negative polarity of a d.c. voltage source. In the present invention the cathode comprises a carbon fiber mass, preferably configured as a felt-like carbon fiber pad. These fibers are electrically conductive and present a large surface area to the solutions passing through the fiber mass. This is particularly true because of the small fiber diameters which the carbon fibers possess. Typically carbon fiber diameters are only one-tenth the diameter of conventionally employed steel wool fibers. This fact provides a significant advantage to the method of the present invention.

While the dilute solution containing one or more noble metals is passed through an electrolytic cell having a carbon fiber cathode, a dc voltage is simultaneously applied between the anode and cathode of the cell so as to deposit metal from the solution directly on to the carbon fibers. The current flowing through the cell depends on several factors including the size of the cell, the conductivity of the solution being passed through the cell and in particular upon the concentration of dissolved ionic species. However, the current levels are generally not unduly high and the cost of electrical energy for performing the method of the present invention is not at all prohibitive, particularly in terms of the value of the recovered metal.

The method of the present invention may be illustrated in the three examples which follow. Example I describes silver removal in a small electrolytic cell; Example II describes silver removal in a larger cell; and lastly, Example III describes gold removal in a small cell.

EXAMPLE I

During one test of the method of the present invention which was particularly employed to remove silver from silver-containing effluent, an electrolytic cell was provided with a flow-through cathode, the active part of which comprised a carbon fiber pad 3 inches in diameter and approximately 3/16 inch thick, weighing approximately 2.8 grams. Approximately, 40 cc of the electrolytic solution filled the cell, a reservoir contained 500 cc of solution and tubing pumps and accessories contained an additional volume of approximately 200 cc. The composition of this solution, simulating a commercial production solution, comprised approximately 5.50 grams per liter of silver as silver cyanide (6.83 grams per liter), 9.70 grams per liter of potassium cyanide in one molar aqueous solution of potassium hydroxide containing approximately 56.1 grams per liter. The cell was operated at a constant current of 2 amperes with cell voltage varying from about 2.8 to 3.8 volts during the course of the hour long experiment. The following table summarizes the results of this test and particularly illustrates an approximately 5,000-fold decrease in the silver ion concentration during the 60 minutes. The first column in the table lists the times at which silver concentration was measured. The second column in the table lists the silver concentration at the specified time, and the third column in the table specifies the ratio of instantaneous concentration, $C_t$, to initial concentration, $C_o$, of silver.

TABLE I

| Time (min) | Ag (ppm) | $C_t/C_o$ |
|---|---|---|
| 0 | 5500 | 1 |
| 14 | 2625 | 0.48 |
| 27 | 68 | 0.124 |
| 34 | 7.0 | 0.0130 |
| 48 | 3.3 | 0.00060 |
| 60 | 1.1 | 0.00020 |

EXAMPLE II

In this experiment an active carbon fiber pad was used as a cathode, the pad being 6 inches in diameter and ½ inch thick; the pad weighed 16.4 grams. The initial solution contained silver at a concentration of 94 parts per million at the start of the experiment. This level was maintained over a period of 23 days while a constant influx of a solution containing 5.5 grams per liter of silver was introduced into the holding reservoir at a rate of 5 milliliters per minute. The electrolytic cell was operated at currents varying between 0.3 and 0.5 amperes with the cell voltages varying between 1.3 and 1.4 volts. At the end of the 23 day period 924 grams of silver was collected in the carbon fiber felt cathode, thereby indicating that about 50% of the void volume in the felt pad was filled with silver.

EXAMPLE III

Three liters of gold solution containing 100 parts per million of gold were treated in a cell similar to that used in Example I. The test solution was prepared from 120 milliliters of a stock solution of 4.28 grams per liter of $KAu(CN)_2 \cdot 2H_2O$ plus 5 grams per liter of potassium cyanide. The solution also contained approximately 0.25 molar $NaH_2PO_4$ and 1.3 molar $Na_2CO_3$ and had a pH of 10.9. Electrolysis of this solution at 2.6 to 3.7 volts and a current of 0.94 to 0.70 amperes over a period of six hours produced the results listed in Table II below:

TABLE II

| Time (min) | Au (ppm) | $C_t/C_o$ |
|---|---|---|
| 0 | 101 | 1 |
| 2 | 97 | 0.96 |
| 12 | 59 | 0.58 |
| 22 | 33 | 0.33 |
| 32 | 18.5 | 0.18 |
| 42 | 15 | 0.15 |
| 70 | 6.5 | 0.064 |
| 120 | 2.0 | 0.020 |

The above described electrochemical process was carried out for a time sufficient to coat the carbon fibers with a relatively uniform noble metal layer.

At this point, the carbon fiber cathode is removed from the cell and can be heated to a temperature sufficient to burn off said carbon fibers. In this way, the noble metal deposited on the carbon fiber cathode is readily recovered without the need to heat the noble metals to their melting point. In particular, temperatures between approximately 250° C. and approximately 400° C. are sufficient to separate the carbon from the deposited noble metals when the carbon fibers are accessible to the oxidizing atmosphere.

From the above, it may be appreciated that the present invention provides an economical method for the recovery of noble metals from solutions containing them, and in particular, from product solutions of hydrometallurgical mining operations. In particular, it is seen that the present invention is low in cost and provides a facile means for separation of the deposited metal from the underlying cathode substrate. The present method also produces a product having high purity due to the absence of base metal contaminants, the carbon fiber substrate being essentially completely oxidized and removed as $CO_2$ gas. It is also seen that the carbon fiber cathode of the present invention exhibits a much greater surface area than previously employed cathodes for this purpose and thereby alleviates many problems associated with mass transfer limitations and electrode kinetics. It is also seen that the present invention is particularly applicable to the recovery of noble metals such as silver and gold from relatively dilute solutions.

While the invention has been described in detail herein and in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for electrowinning of noble metals comprising:
   passing a solution containing noble metals through an electrolytic cell having an anode and cathode, the cathode of which comprises a carbon fiber mass;
   simultaneously applying a direct current voltage between said anode and cathode, the negative polarity of said voltage being applied to said cathode, so as to deposit said dissolved metal on said carbon fiber cathode;
   removing said fiber mass from said cell; and
   heating said plated fiber mass to a temperature sufficient to burn off said carbon fibers.

2. The method of claim 1 in which said heating step is performed at a temperature of between approximately 250° C. and approximately 400° C.

3. The method of claim 1 in which said noble metals are selected from the group consisting of silver, gold and combinations thereof.

4. The method of claim 1 in which said heating step is performed at a temperature sufficient to also melt said metal deposit.

* * * * *